United States Patent
Doherty et al.

(10) Patent No.: US 11,113,913 B1
(45) Date of Patent: Sep. 7, 2021

(54) TEMPERATURE BASED ACCESS CONTROL

(71) Applicant: keee, LLC, Clayton, MO (US)

(72) Inventors: Patrick Doherty, Town and Country, MO (US); John Wall, Shiloh, IL (US); Michael S. Biviano, St. Louis, MO (US)

(73) Assignee: SATURDAY CAPITAL, LLC, St. Louis, MO (US)

(*) Notice: Subject to any disclaimer, the term of this patent is extended or adjusted under 35 U.S.C. 154(b) by 0 days.

(21) Appl. No.: 16/925,066

(22) Filed: Jul. 9, 2020

Related U.S. Application Data

(60) Provisional application No. 63/028,040, filed on May 21, 2020.

(51) Int. Cl.
*G07C 9/25* (2020.01)
*G01K 7/02* (2021.01)
*H04L 29/08* (2006.01)

(52) U.S. Cl.
CPC ............ *G07C 9/257* (2020.01); *G01K 7/02* (2013.01); *G07C 9/253* (2020.01); *H04L 67/12* (2013.01)

(58) Field of Classification Search
CPC .......... G07C 9/253; G07C 9/257; G01K 7/02; H04L 67/12; G06F 21/32; G06F 2221/2111
See application file for complete search history.

(56) References Cited

U.S. PATENT DOCUMENTS

| | | |
|---|---|---|
| 2004/0254472 A1 | 12/2004 | Mcquilkin |
| 2007/0222554 A1 | 9/2007 | Hart |
| 2010/0164680 A1* | 7/2010 | Yancey ............... G07C 9/27 340/5.32 |
| 2012/0319847 A1 | 12/2012 | Heller |
| 2013/0127591 A1* | 5/2013 | Shay ............... H04L 63/0853 340/5.52 |
| 2013/0131541 A1 | 5/2013 | Tsai et al. |

(Continued)

FOREIGN PATENT DOCUMENTS

WO 2011005224 A1 1/2011

OTHER PUBLICATIONS

Herrera, Juan, "Authorisations based on body temperature", nedap, May 13, 2020, 9 pages.

(Continued)

*Primary Examiner* — Kevin Bechtel
*Assistant Examiner* — Sangseok Park
(74) *Attorney, Agent, or Firm* — Dorsey & Whitney LLP

(57) ABSTRACT

The present disclosure relates to systems and methods of control access to a controlled-access area. The method includes receiving offsite sensor data, receiving offsite user identification data corresponding to the offsite sensor data, determining that the offsite sensor data satisfies an organizational standard, determining that the offsite user identification data corresponds to an approved user, and transmitting a notification to a user device. The method may also include receiving onsite user information and using the offsite sensor data and the onsite user information to determine if a user is approved for access to an access-controlled area. In some examples, the offsite sensor data may be temperature data associated with a febrile condition of a user attempting to gain access to the controlled-access area.

38 Claims, 10 Drawing Sheets

(56) References Cited

U.S. PATENT DOCUMENTS

| | | | |
|---|---|---|---|
| 2016/0116348 A1 | 4/2016 | Lee et al. | |
| 2017/0258335 A1 | 9/2017 | Heller | |
| 2017/0262589 A1* | 9/2017 | Ortiz | G06Q 20/3223 |
| 2018/0181737 A1* | 6/2018 | Tussy | G06K 9/00335 |
| 2018/0239977 A1* | 8/2018 | Matsimanis | G06K 9/00288 |
| 2019/0096210 A1* | 3/2019 | Jarvis | G06Q 10/06 |
| 2019/0112150 A1* | 4/2019 | Uetsu | B66B 1/468 |

OTHER PUBLICATIONS

Kintronics—IP Security Solutions, "IP Door Access Control—Access Control Systems Overview", (https://kintronics.com/solutions/ip-door-access-control/ip-door-reader-comparison/), 2020, 27 pages.

Kintronics IP Security Solutions, "Professional Biometric Door Readers—Biometric IP Door Readers for Access Control", https://kintronics.com/solutions/ip-door-access-control/multimode-biometric-door-control-readers/professional-biometrio-door-readers/, 2020, 14 pages.

Kintronics IP Security Solutions, "Smartphone Door Access Using Bluetooth Reader—Mobile Credentials Enabled Door Access Systems", (https://kintronics.com/wp-content/uploads/2014/07/Mobile-Credential-concept.jpg), 2020, 9 pages.

Mastrangelo, Teresa, "IoT and mobile apps taking on new roles in the 'new normal'", May 18, 2020, 5 pages.

CMU—Queen, Scott, "CMU Changes Safeguard Student Health", https://news.centralmethodist.edu/2020/08/changes-to-safeguard-student-health.html, Aug. 9, 2020, 3 pages.

NYT—McNeil, Donald Jr., "Can Smart Thermometers Track the Spread of the Coronavirus?", https://www.nytimes.com/2020/03/18/health/coronavirus-fever-thermometers.html, Mar. 18, 2020, 3 pages.

Youtube, "Presage PreCheck—Channel", https://www.youtube.com/channel/UCYcYvvB8f4UE55DZdtPXk9Q/videos, Sep. 2020.

* cited by examiner

TEMPERATURE BASED ACCESS CONTROL

FIELD

Examples described herein generally relate to systems and methods for temperature-based access control, such as access to buildings, areas, and the like.

CROSS-REFERENCE TO RELATED APPLICATIONS

This application claims the benefit of priority pursuant to 35 U.S.C. § 119(e) of U.S. provisional patent application No. 63/028,040, filed 21 May 2020, entitled "TEMPERATURE BASED ACCESS CONTROL," which is hereby incorporated by reference herein in its entirety.

BACKGROUND

Many buildings, campuses, floors, and the like, have security measures, such as on-duty guards, locked doors, gates, and the like, that help to limit and control the people that enter and/or exit the particular area. For example, many office buildings include gates, elevators, or turnstiles that require an access object, such as a key fob or radio frequency identification element, to open or activate. These types of measures help to prevent unauthorized persons from accessing select areas. However, many of these security measures and checkpoints are positioned within a building or other area, such as a reception area of an office floor. As such, these types of security measures may be inadequate in preventing contamination from persons carrying disease, bacteria, toxic elements, or the like. For example, a person having a disease, such as a viral infection, may interact with many surfaces within a building and/or with people within the building, before being denied access, putting people within the building or area at risk. Current solutions, such as on-site thermal detectors often require a close spatial range in order to detect certain characteristics (e.g., fever) and thus cannot screen access before contamination may occur.

SUMMARY

In one example, a method is disclosed. The method includes receiving offsite sensor data, receiving offsite user identification data corresponding to the offsite sensor data, determining that the offsite sensor data satisfies an organizational standard, determining that the offsite user identification corresponds to an approved user, and transmitting a notification to a user device. The method may also include receiving onsite user information and using the offsite sensor data and the onsite user information to determine if a user is approved for access to an access-controlled area.

In another embodiment, a system to control access to an access-controlled area is disclosed. The system includes a user device configured to receive offsite user identification data associated with the user and a process element in communication with the user device. The processing element is configured to determine that the offsite sensor data satisfies an organizational standard, determine that the offsite user identification data corresponds to an approved user; and transmit a notification to the user device.

In another example, a method is disclosed. The method includes receiving sensed biometric data, the biometric data may be authenticated to a user either before or after receipt The method includes determining that the sensed biometric data satisfies an organizational standard. Based on the sensed biometric data meeting the organizational standard, the user is approved to access an access-controlled area. An approval is transmitted to the user device.

In addition to the exemplary aspects and embodiments described above, further aspects and embodiments will become apparent by reference to the drawings and by study of the following description.

SPECIFICATION

The present disclosure includes systems and methods to allow access control based on detected characteristics, e.g., temperature, and user identification, where at least some of the characteristics are detectable before a user has accessed or is near an access-controlled area. In one embodiment, an access control system is disclosed that includes an offsite sensor that detects characteristics of a user (e.g., temperature), transmits the detected characteristics along with a user identifier (e.g., self-captured, time stamped, captured image of the user), to an access server. The access server may determine whether the user identifier matches with an approved user (e.g., a current employee) and whether the detected characteristic satisfies access requirements set by an organization (e.g., temperature is below a predetermined threshold). In instances where the user is both verified and the characteristics satisfy the requirements, a notification may be transmitted to the user device indicating that the user is able to access the premises. In one example, the notification may also act as a secondary authentication to further confirm the access of the user.

After the access has been granted and as the user approaches and/or enters the premises or other access-controlled area, an onsite sensor, such as a camera, may further capture user information. For example, the onsite sensor may capture an image of the user's face and/or secondary authentication (e.g., barcode displayed on the user's device), and use the captured onsite information to make an access determination for the user. In the event that the user is verified onsite and (if used) the secondary authentication is authenticated; the system will permit access.

Figure 1:
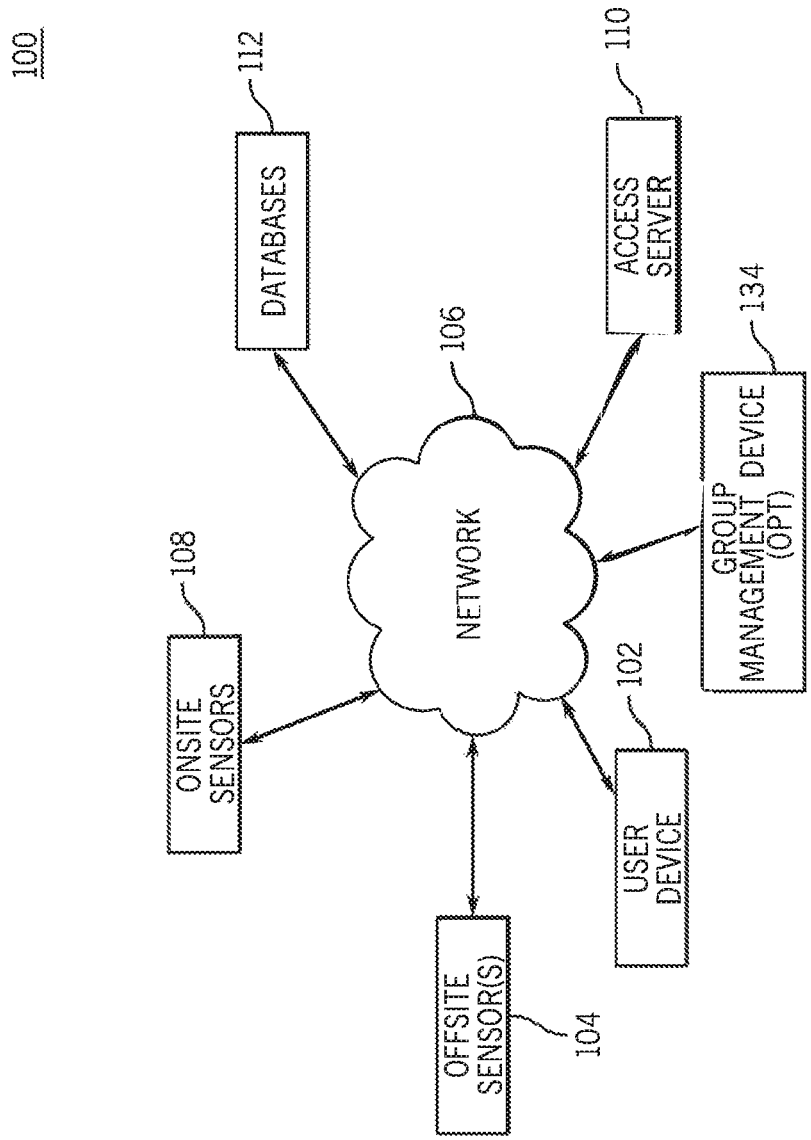
FIG. 1 is a simplified diagram of a system for providing access based on offsite sensor data.

FIG. 1 illustrates an example of an access system 100. The system 100 may include one or more user devices 102 that interact with the system 100 via a network 106. In many implementations, the system 100 may include multiple user devices 102, allowing individual people to interact separately with the system 100 via separate user devices 102. The user device 102 is any type of computing device that can transmit and receive data from other computing devices. For example, the user device 102 may be a smartphone, tablet computer, wearable device, laptop, and so on. The user device 102 may include an image sensor, such as a camera, that allows a user to capture image data. The user device 102 may be in electronic communication with one or more other devices of the system 100, either directly, or via a network 106.

The system 100 may also include one or more offsite or remote sensors 104. The offsite sensors 104 may be positioned away from an access-controlled area when capturing data. In many instances, the offsite sensor 104 may be portable. The number and type of offsite sensors 104 are dependent on the types of characteristics desired to be tracked or monitored. In one example, an offsite sensor 104 is a temperature sensor (e.g., infrared or thermal temperature detectors) that can detect temperature characteristics from a person. A temperature sensor may be any type of contact or non-contact temperature measuring device such as a thermistor, thermocouple, resistance temperature device, infrared sensor, bulb thermometer, or the like. The offsite sensor 104 may also include a camera or image sensor that can capture images, e.g., images of a user. It should be noted that the offsite sensors 104 may be standalone sensors (e.g., thermometer) or may be integrated in the user device 102 or other devices. For example, in one embodiment, a first offsite sensor 104 is a standalone thermometer and a second offsite sensor 104 is a camera integrated into the user device 102. Additionally, the offsite sensors 104 may communicate directly with the network 106 and other elements of the system 100 or may communicate indirectly with the network 106 and other elements, e.g., via the user device 102. The offsite sensor 104 may include one or more identification or authentication elements, which may be dynamic or static, e.g., a random number generator assigned with a particular user, a serial number, or the like. Additionally, the offsite sensor 104 may also include one or more communication mechanisms that allow the offsite sensor 104 to communicate with the user device, network.

The onsite or location sensors 108 may be similar to the offsite sensors 104, but generally may be located on or near the access-controlled area. In one example, the onsite sensors 108 may be installed within an area or perimeter 126 of the access-controlled area (e.g., security cameras), but in other examples, the onsite sensor 108 may be portable and movable between different access-controlled areas as needed. The onsite sensor 108 may be any type of sensor that can detect characteristics of users. In one example, the onsite sensor 108 is a camera that can capture image data, e.g., RGB and/or depth information, of persons within a particular range, such as persons entering an access control perimeter 126 or other area. The onsite sensors 108 may also be able to detect authentication information, such as identifiers (e.g., barcodes, Quick Response ("QR") codes, radio frequencies, etc.), and the like, that can be used in addition to or in place of the user detected information (e.g., facial information). The type, number, and location of the onsite sensors 108 may vary depending on the access-controlled area 128 characteristics (e.g., size, location, number of possible persons requesting access), desired characteristics and authentication information to be used by the system 100 and the like.

The access server 110 or access processor may receive information from the user device 102, the onsite sensors 108, and/or the offsite sensors 104 to determine whether a person can access an access-controlled area 128. For example, the access server 110 may both authenticate a person (e.g., determine if a person is an employee with clearance to access a particular area), as well as the person satisfies biometric characteristics (e.g., temperature below a threshold). In many embodiments, the access server 110 may verify biometric characteristics at a first point in time separate from an access determination and user authentication, or may perform a secondary user authentication at a second point in time or second location. For example the access server 110 may first receive biometric data and determine that a person has satisfied the biological requirements (e.g., is not febrile) to enter the access controlled area and then may detect the person attempting to enter the access controlled area and verify the person's identity and access level, to allow access. In some embodiments, the access server 110 may include one or more computing devices (e.g., servers, computers, etc.), that may be a single device or multiple devices operating in a distributed environment.

The system 100 may also include one or more databases 112 that may store information related or used by components of the system 100. For example, the databases 112 may include facial recognition databases that store reference images or reference data corresponding to different users (e.g., employees) that can be used to verify a user identity or authenticate a user. As another example, the databases 112 may include biometric data and history for a particular user or entity. The type, structure, and data stored within the various databases 112 may be varied depending on the types of characteristics detected, authentication methods and elements used and the like.

The network 106 transmits data between the various components of the system 100. The network 106 may include two or more communication methods (e.g., Bluetooth and Wi-Fi) to communicatively couple the system 100 elements. The network 106 may include wireless and wired transmission methods, such as, but not limited to, radio transmissions, Ethernet, Wi-Fi, local area network, ZigBee, wide area networks, and so on.

The system 100 may optionally include one or more group management devices 134.

The group management device 134 is any type of computing device that can transmit and receive data from other computing devices. For example, the group management device 134 may be a smartphone, tablet computer, wearable device, laptop, and so on. The group management device 134 may include an image sensor, such as a camera, that allows a user to capture image data. The group management device 134 may be in electronic communication with one or more other devices of the system 100, either directly, or via a network 106. The group management device 134 may be used to manage user devices 102 that interact with the system 100. In various implementations, the group management device 134 may be configured to display user access data that may correspond, for example, to whether a user has satisfied access conditions for a particular area (e.g., temperature thresholds and/or identity confirmation), as well as whether a user has been screened for such access conditions. In this manner, a user of the group management device 134 can make real-time decisions regarding access based on system information.

Figure 2:
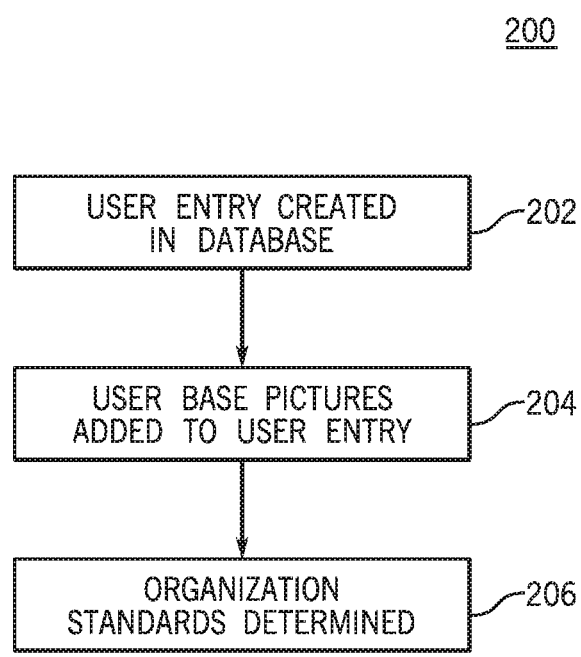
FIG. 2 is a flow chart illustrating a method for generating user information in an access database.

FIG. 2 is a flow chart of a method 200 to generate an access database for a user with the system 100. The method 200 may begin with operation 202 and a user entry may be created and stored within a database 112. For example, an employer may enter details for a new employee, such as, but not limited to, name, age, contact information (e.g., phone number, email address, etc.). In some instances, the user entry may also include information corresponding to a particular offsite sensor 104 that may be assigned or tied to the user. In one example, organizations or entities may provide offsite sensors 104 to users to allow the users to engage with the system 100 to provide access. In other examples, users may have personal offsite sensors 104 that are assigned to the user entry in the database, e.g., registered to the user. In some instances, the database entry may also include an access key or access information corresponding to the user, e.g., key fob identifier, badge number, or the like. The user entry may be stored in one or more databases 112 that may be accessed by the access server 110 and/or may be stored within memory components on or accessible by the access server 110.

In operation 202, a user may be assigned an anonymizing identifier that corresponds the user entry. The anonymizing identifier may be configured to uniquely identify a person, yet not identify the person's true identity if intercepted or viewed outside of the context of the user entry. For example, a user may be given an anonymizing identifier "user1234" that identifies the user to the system, but does not identify the user's name or other sensitive information to others who may intercept the anonymizing identifier.

The method 200 may also include operation 204 and one or more user pictures may be stored in the database 112. For example, "base pictures" of the user from one or more viewpoints may be captured, such as by the user device 102, or other camera, and stored in the database 112. In some instances, the user may capture his or her images and in other instances, an administrator or other employee may capture images of the user as part of an onboarding process. The type, number, and viewpoints of the images may depend on the types of biometric and user identification that may be utilized by the system 100. In some examples, the images may capture the user's face in a base or neutral position, which may assist in identifying additional images of the user by facial recognition or other techniques. The base images may be color images and/or may include depth information. To that end, while the term "image" is used, other types of data useful for biometric identification, such as a facial mesh 124, or other facial data may be stored rather than the actual images. In other words, while images and depth information may be captured, this information may be analyzed to extract facial data which may be stored in the database 112 rather than the actual images of the user.

With continued reference to FIG. 2, in operation 206, the method 200 may include determining organizational standards for the biometric data to be detected or received by the system 100. For example, for users added to the database 112, the system 100 may assign particular biometric information, e.g., temperature thresholds, that are required by the user's organization to gain access to select areas, and this information may be tied or otherwise linked to the user's entry in the database 112. As another example, user entries may be stored in an organization database, where global biometric parameters may apply to all entries. The organizational standards may be determined by direct entry from an administer and/or may be retrieved from third party sources, such as government and health databases.

Figure 3:
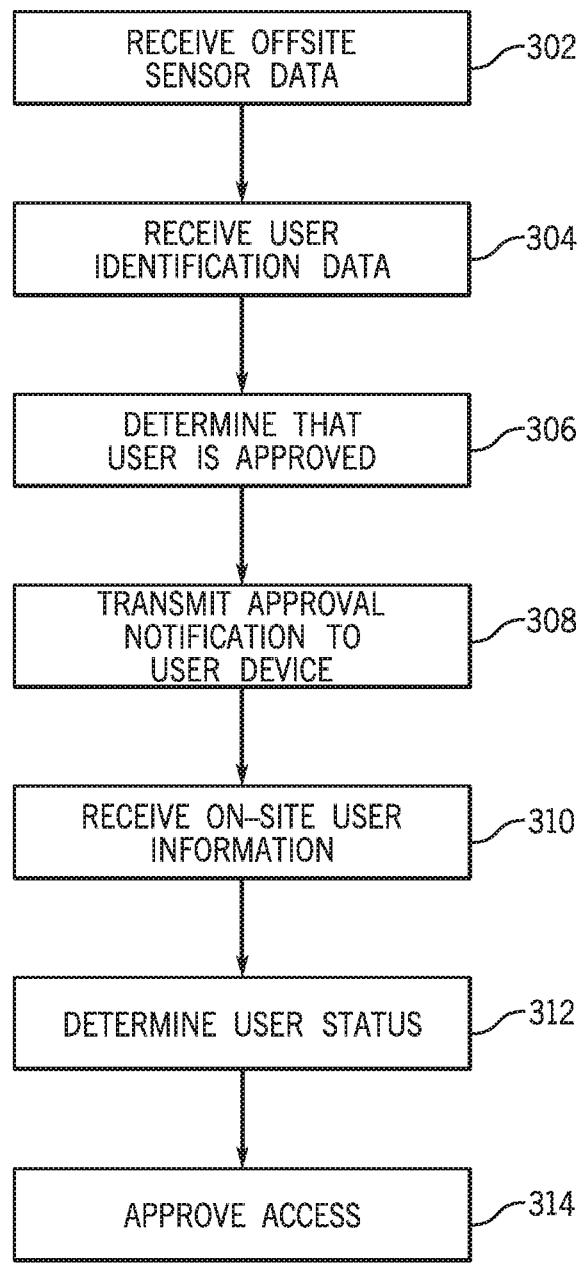
FIG. 3 is a flow chart illustrating a method of providing access to an access-controlled area with the system of FIG. 1.

FIG. 3 is a flow chart illustrating a method 300 for utilizing the system 100 to provide or restrict access to access-controlled areas. The method 300 may include operation 302 and offsite sensor data is received. Offsite sensor data may include data related to any suitable biometric characteristic of a user. In many implementations, biometric or biological characteristics may include a user's body temperature, an indication of coughing or sneezing, shortness of breath, loss of sense of taste or smell, nasal discharge, red eyes, diarrhea, nausea, vomiting, fatigue, body aches, dizziness, sore throat, pulse rate, pulse oxidation, blood pressure, or the like, or combinations of two or more biometric characteristics. Sensing more than one biometric characteristic may increase screening accuracy for certain illnesses. For example, screening for COVID-19 infection may be more accurate if temperature and sense of smell are both assessed. For example, the offsite sensor 104 or remote sensors may transmit data via the network 106 to the access server 110. As one example, the offsite sensor 104 may transmit its data first to the user device 102, e.g., via Bluetooth, which may transmit the offsite sensor data to the access server 110 via the network 106. In another example, the offsite sensor 104 may transmit its data directly to the access server 110 via the network 106.

Anosmia, or a decreased or absent sense of smell may be indicative of an illness. In some implementations, where the sensed biometric data includes an assessment of a user's sense of smell, a remote sensor 104 may include a scent emitting element (e.g., a scratch and sniff sticker; an odorous gas, aerosol, liquid, or the like). The remote sensor 104 may emit a scent and ask the user (e.g., via a menu on a screen) to identify the scent. The remote sensor may include more than one scent and may randomly select one for the user to identify. For example, the remote sensor may include three scented liquids scented like bananas, garlic, and roses, respectively. The remote sensor 104 may emit one scent randomly chosen from among the three and ask the user to identify the scent by choosing from a list of available scents. If the user fails to choose, or chooses incorrectly, the remote sensor 104 may indicate the user has anosmia. The strength of the scent may be varied by the remote sensor, for instance based on a user's age, gender, ethnicity, or other factor.

In operation 304, the access server 110 may receive user identification data. In some instances, the user identification data may be offsite user identification data tied to, linked, or coupled to the offsite sensor data such that the sensor data is able to be connected to a particular user. As one example, the user device 102 may capture an image of the user while the user is utilizing the offsite sensor 104 to capture biometric data, and may transmit the reading of the offsite sensor 104 and the user image as a package to the access server 110. In other examples, the user identification data may be transmitted separately from the offsite sensor data. As one example, the user identification data may include an image, e.g., selfie, of the user with time stamp information, and may be transmitted to the access server 110 to verify the user identity based on the based user images or other facial information. As can be appreciated the type of data captured in operation 304 may depend on the type of user identification used by the system 100.

In operation 306, the access server 110 determines whether the user is approved. For example, the access server 110 may determine whether the biometric sensor data received from the offsite sensor 104 falls within or below the organizational standards. For example, the system may compare a user's body temperature to a threshold temperature and determine whether the user is febrile. In another example, the system may compare user pulse oxidation data and determine that the user has a decreased oxygen saturation and may be experiencing respiratory symptoms of a health condition. Additionally, the access server 110 may determine whether the user is authorized, or identifiable based on the user identification data received. This may include analyzing a captured user image with facial recognition information stored in the database 112 or other components accessed by the access server 110. In another example, the system may assess the color of the whites of the user's eyes in a captured user image and determine that the user's eyes are red, possibly indicating a health condition. In some embodiments, operation 306 may also determine whether the particular user is approved to access the access-controlled premises within a time frame, e.g., within 30 minutes, 1 hour, or that day. For example, organizations may restrict access to select users based on time of day, day of the week, etc., and the server 110 may verify that in addition to the biometric data identifying the user and being acceptable, that the user is approved for access.

With continued reference to FIG. 3, the method 300 may include operation 308 and the access server 110 may transmit an approval notification to the user. For example, the access server 110 may transmit a short messaging message, email, in-app alert, or other alert to the user device 102 indicating that the user biometric data has satisfied the standards, that the user has been identified, and/or that the user is approved for access. In some embodiments, the approval notification may include authentication data, such as a secondary authentication, that can be used by the user to demonstrate such access. For example, the approval notification may include a barcode, QR code, or uniquely generated element, that can be displayed on the user device 102 or transmitted by the user device 102 to other components. The type of authentication data may vary based on the organization and desired security access levels.

In operation 310, the access server 110 may receive onsite user information. For example, the user may proceed to the perimeter 126 of the access-controlled premises or area and the onsite sensors 108 may capture additional information about the user. In some instances, the onsite user information may be captured at a second time separate from the time that the offsite sensor data is received, e.g., a user may capture the offsite sensor data from his or her car, and then walk to the building where the onsite sensors 108 may capture the information. In one example, an onsite sensor 108 may capture image information of the user, e.g., pictures of the user's face, clothing, and the like, that may be used to identify the user. Additionally, in instances where authentication data was included in the notification, the onsite sensors 108 may further capture the authentication information as part of the onsite user information.

In operation 312, the access server 110 may determine whether the user is approved to access the access-controlled area. For example, the access server 110 may retrieve the prior approval information from the database 112, confirm based on the onsite user information is the same user as was previously approved, and assuming no changes in status, may determine that the user is approved to enter. In another example, the access server 110 may rerun the offsite biometric data in light of the current standards and confirm the user access based on the onsite user information to determine that the user is approved. In many embodiments, the onsite user information may be directed to identifying the user, rather than verifying biological characteristics (e.g., temperature), but in other embodiments, the onsite user information may also include additional biometric information that could be used to verify that the user is in continued compliance with the organizational standards. The latter example may be particularly useful if a large amount of time has passed since the offsite sensor readings were determined.

Operation 312 may further include verifying that the user is able to access the access-controlled area at the particular time. For example, the access server 110 may verify that the user is a current employee with authorization to access the access-controlled area at the particular time.

In operation 314, once the user status has been determined, the access server 110 may approve access. In some embodiments, the access server 110 may transmit an approval notification to another user device, such as a guard computing device or kiosk. In some embodiments, the access server 110 may transmit the approval to a computing device or component, such as a turnstile, gate, elevator, or the like, that can open or activate to allow the user to enter. The system 100 may monitor user location during and after approving access, e.g., by utilizing global positioning system information from the user device or via access points that track the movement of the user. For example, the system may determine whether the user has entered a zone of high infection risk or "hot zone" and may revoke access. Likewise, the system 100 may revoke access if the user has not accessed the access-controlled area 128 within a given time. For example, upon granting access, the system may start a timer for a predetermined time, e.g., ten minutes, and if the user does not present at an on-site sensor requesting access within that time, the access may be revoked. Likewise, access may need to be re-approved, after the expiration of a certain time, even if the user has entered the access-controlled area 128. For example, a user may be required to be reapproved every six hours while within the access-controlled area 128. Such a requirement may determine whether users develop febrile conditions during the course of their presence within the access-controlled area 128. In these instances, the system may transmit a notification to the user device indicating that the user needs to be reapproved by the system. Additionally, the system may require a user to be re-approved upon leaving the access-controlled area 128.

Figure 4:
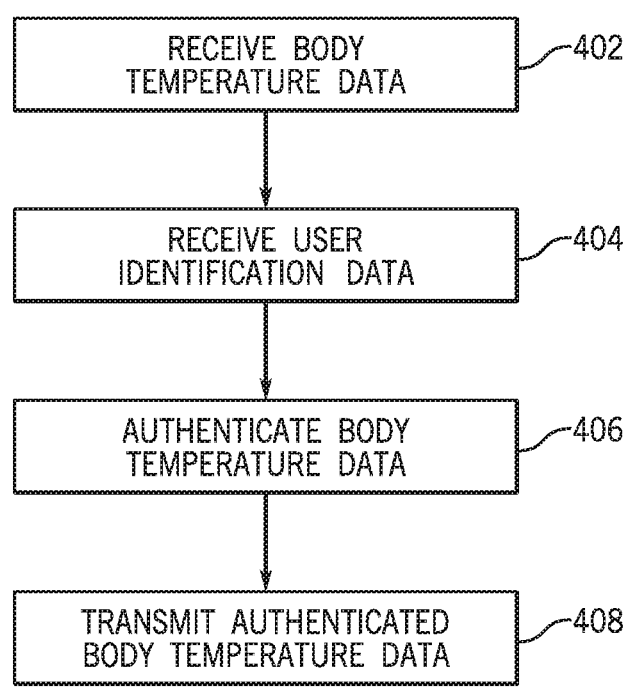
FIG. 4 is a flow chart illustrating a method of authenticating body temperature data to a user with the system of FIG. 1.
Figure 6A:
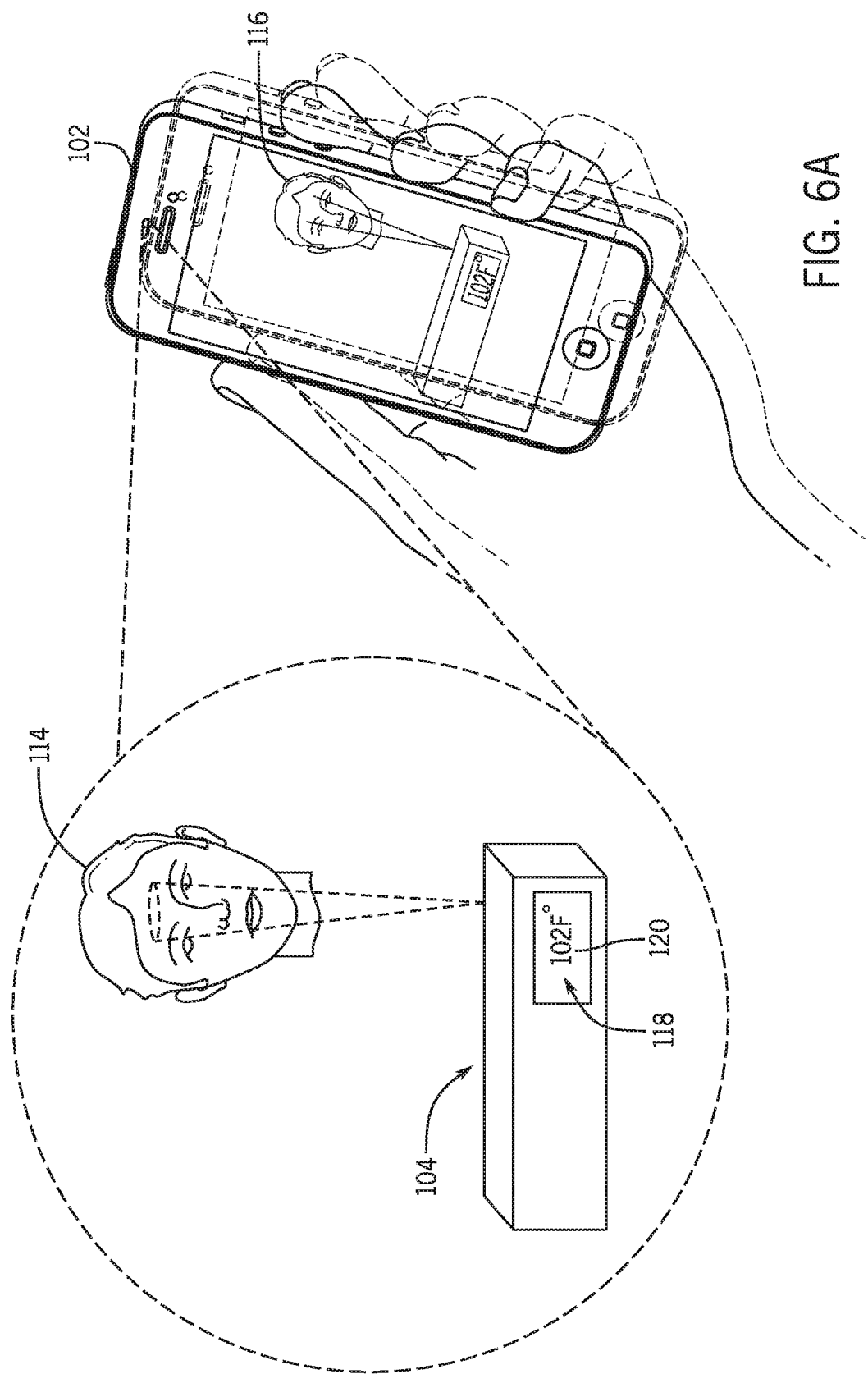
FIGS. 6A-6C are simplified diagrams of a portion of an embodiment of the system of FIG. 1.
Figure 6B:
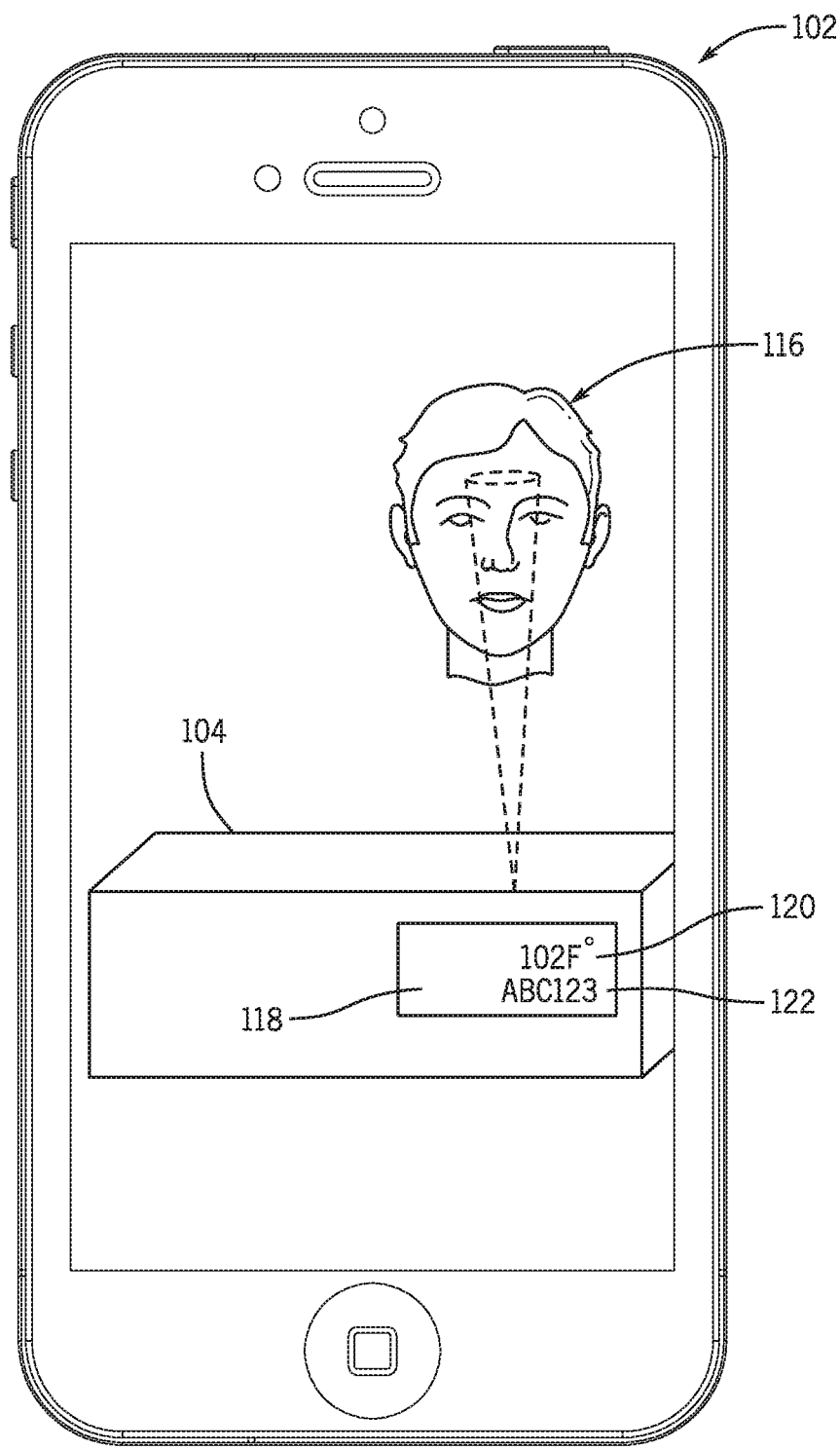
Figure 6C:
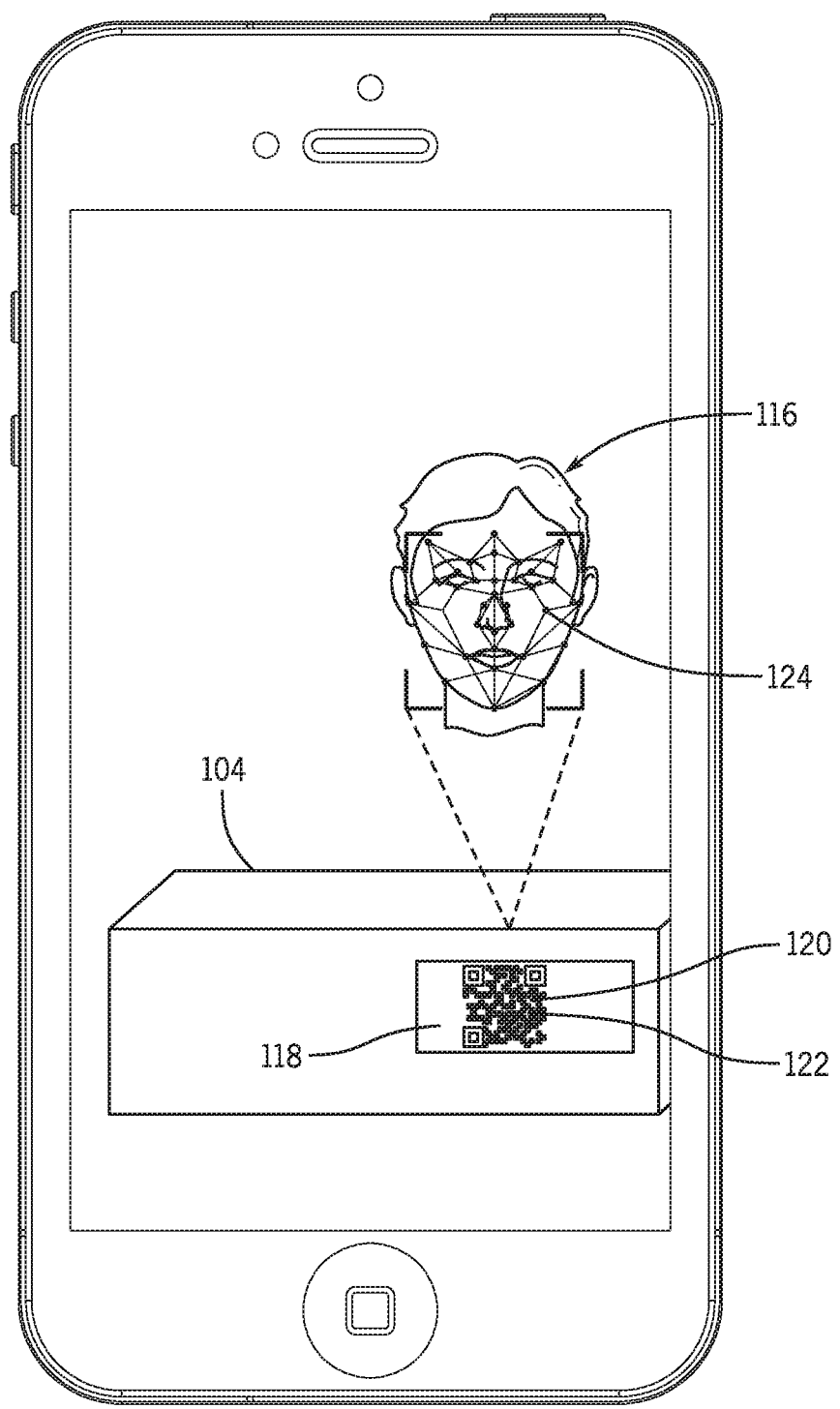

FIG. 4 is a flowchart of a method 400 to authenticate sensed biometric data to a user, such as to correspond data to a user, suitable for use with the system 100. Reference may also be made to FIGS. 6A-6C, illustrating an embodiment of a portion of the system 100 as may be used to execute the method 400. The method may include operation 402 and the sensed biometric data (e.g., temperature data) is received. As described with respect to the method 300 the biometric data can be any suitable biometric characteristic of a user. The biometric data may be received by an offsite sensor 104. For example, a thermometer may capture a user's body, skin, oral, ear, axillary, or other temperature. In another example, a pulse oximeter may determine a user's blood oxygen saturation. In another example, a respirometer may determine a user's lung function, and so on. In another example, a user facial image 116 may be used to determine the color of the whites of the user's eyes. Temperature data may be correlated to a body temperature. For instance when the temperature data is a skin temperature, the skin temperature may be correlated to an expected body temperature.

An offsite sensor 104 may be integrated into a user device 102 or may be a standalone device. As described previously with respect to FIG. 3, an offsite sensor 104 may be in communication with a user device 102 and information, such as sensed biometric data, may be transmitted between the offsite sensor 104 and the user device 102. In some embodiments, sensed biometric data may be transmitted wirelessly via radio frequency using Bluetooth, near field communication, Wi-Fi, or the like. In other embodiments, the offsite sensor 104 may display indicia 120 indicating a sensed biometric data measurement and/or other data, which may be captured via a camera on the user device 102 and analyzed to determine the data. For example, an offsite sensor 104 may include a display such as a liquid crystal display, light emitting diode display, or the like that displays sensed biometric data and/or other information, such as metadata, received or generated by the offsite sensor 104. In some implementations, the indicia 120 may be implemented as one or more alphanumeric characters, which may be machine or human readable. In some implementations, the indicia may be implemented as a machine-readable code such as a barcode, QR code or the like.

In addition to sensed biometric data, in operation 402, the system 100 may receive metadata associated with the sensed biometric data. For example, the system 100 may receive time stamp, location, or sensor data (e.g., sensor model, identifier, or user association) associated with the sensed biometric data. In a specific example, temperature information may include a user's skin temperature measurement, a global positioning system ("GPS") location, and/or timestamp indicating respectively where and when the temperature information was received, a thermometer identifier (e.g., serial number), and an indication linking the thermometer identifier to a particular user and/or user device 102. Metadata may be received with any sensed biometric data. In some implementations, location data may be abstracted to a larger geographic area. For example, rather than working with a user's precise GPS coordinates, the system may abstract the user's location to a county, city, zip code, or the like. Metadata may be generated by a user device 102, by an offsite sensor 104, or other device. For example, the user device 102 and/or offsite sensor 104 may include a device in communication with a GPS satellite to determine user location. Likewise, the user device 102 or the offsite sensor 104 may include a device in communication with a cellular network and determine a user's location based on radio triangulation, internet protocol ("IP") address geolocation, or the like.

In some embodiments, metadata may include a dynamic identifier 122. For example, an offsite sensor may include a code generator that generates a dynamic identifier 122 based on a seed value. The code generator may generate a dynamic identifier 122 for a given time stamp and the seed value. In one example, a dynamic identifier 122 generated may be unique for a given seed and time stamp. The dynamic identifier 122 may be created with a cryptographic hash, such as an SHA-1 cryptographic function. The dynamic identifier 122 may be ephemeral, and may be regenerated after a given time. For example, a dynamic identifier 122 may be generated and refreshed after a minute, with a new dynamic identifier 122 based on the seed and the new time.

In operation 404, user identification data is received by an offsite sensor 104. An offsite sensor 104 may be associated with a user device 102. For example, a user device 102 may include a camera used as an offsite sensor. Identification data may include information about the user that the system 100 can use to confirm the identity of a user. In some embodiments, the identification data may be any biometric information that confirms the identity of a user, such as a facial mesh 124, fingerprint, retinal scan, or the like. In some embodiments, the identification data may include a non-biometric identifier such as a password, passcode, barcode, QR code, or the like. As with operation 402, in operation 404, metadata associated with the user identification data may be received. For example, user identification data may include a GPS location, IP address geolocation, and/or cellular network location and/or timestamp indicating respectively where and when the identification information was received, a remote sensor identifier (e.g., a serial number of a user device 102), a dynamic identifier 122, and/or an indication linking the offsite sensor receiving the user identification data to a particular user and/or an offsite sensor 104 receiving the sensed biometric data in operation 402, such as a thermometer. Identification data may be received by any suitable method, such as machine vision, wired or wireless transfer, or the like.

With continued reference to operation 404, after user identification data is received, the user's identity may be confirmed by the system 100 based on the user identification data. For example, the identification data may be used by the system 100 to confirm that a user matches an identity of a user whose information is held in a user entry, such as a user entry created in operation 202 of method 200. In some embodiments, a user identity may be confirmed by the user device 102. In some embodiments, user identification data may be transmitted from the user device 102 to another device such as an access server 110 that confirms the user identity. The system 100 may compare user identification data to one or more user entries, for example user entries held in the database 112. For instance, as previously described with respect to operation 304 of method 300, the identification data may include a selfie or image of the user's face. A facial mesh 124 may be determined based on a facial image 116 captured in operation 404 and compared to a facial mesh 124 stored in a user entry. For example, a facial mesh 124 determined based on a facial image 116 captured by a user device 102 may be compared against facial meshes 124 stored in user entries in the database 112. When a facial mesh 124 in a user entry matches a facial mesh 124 determined in operation 404, the system 100 may confirm that the user for whom user data is received matches a user entry in the database 112. In some embodiments, a facial image 116 is not transmitted from the user device 102, such as when privacy is a concern. In such embodiments anonymized user identification data, such as a facial mesh 124 may be transmitted. In some embodiments, sensed biometric data and user identification data may be received at substantially the same time. That is, the operations 402 and 404 may be executed concurrently. In other embodiments, the operations 402 and 404 may be executed serially, in any order.

In operation 406, the system 100 authenticates that sensed biometric data received in operation 402 is associated with the user whose identity has been confirmed in operation 404. The system 100 may use data received in operations 402 and/or 404 to authenticate the sensed biometric data to a particular user. In many embodiments, the system 100 may receive user identification data contemporaneously with the sensed biometric data. For example, a user device 102 may capture a facial image 116 of the user where the facial image 116 also includes a view of an offsite sensor 104 such as a thermometer, pulse oximeter or other offsite sensor 104 with an optical display 118 indicating the sensed biometric data and optional metadata associated with the sensed biometric data, such as shown for example in FIG. 6A discussed further below. In other examples, the offsite sensor 104 may transmit sensed biometric data to a user device 102 using radio frequency, as previously described, contemporaneously with the receipt of the user identification data. Thus, the method may thwart or prevent users from attempting to improperly gain access to an access-controlled area 128 by falsifying biometric data.

For instance, the system 100 may compare metadata received in operations 402 and 404 and determine whether the metadata are consistent. For example, when a time stamp received with sensed biometric data in operation 402 is close in time to a time stamp received in operation 404, the system 100 may determine that the data are consistent and authenticate that the sensed biometric data is associated with a user.

Likewise, the system 100 may compare a dynamic identifier 122 associated with sensed biometric data to a dynamic identifier 122 associated with the user identification data. Both dynamic identifiers may be independently generated based on the same seed and a timestamp. When the dynamic identifiers match, the system may determine they are consistent and authenticate the sensed biometric data with the user. In some embodiments, the system 100 may use a code generator with the same seed used by the offsite sensor 104 and/or user device 102 to generate a confirming dynamic identifier that may be compared to either or both of the dynamic identifiers associated with the temperature and/or user identification data. Similarly, when a location received in operation 402 is spatially close to location information received in operation 404, the system 100 may determine that the data are consistent and authenticate that the sensed biometric data is associated with a user. The system 100 may compare such information received in operations 402 and/or 404 and determine whether the information is consistent and may authenticate that the sensed biometric data is associated with the user.

The system 100 may compare an identifier of an offsite sensor receiving biometric data, such as a serial number of an offsite sensor, to an identifier of an offsite sensor receiving user identity data and determine that one or both offsite sensors are associated with a user. For example, a user entry in the database 112 may be associated a sensor identifier of an offsite sensor (e.g., serial number). The system 100 may receive sensor identifier data as metadata with the sensed biometric data and may compare the received sensor identifier with the sensor identifier in the user entry to determine if the received identifier is associated with the user. When the received sensor identifier matches the sensor identifier in the user entry, the system 100 may authenticate the sensed biometric data to the user.

In operation 408, the authenticated sensed biometric data is transmitted from a user device 102 and/or the offsite sensor 104 to another device in the system 100, such as the access server 110. The transmission may occur by any suitable method, such as via the network 106. In many implementations, the transmission may be via a cellular or Wi-Fi network. In some implementations, user identification data may be transmitted to the access control server 110. In some implementations, the offsite sensor 104 may sense biometric data and may transmit the same to the system 100 without transmitting through a user device 102. For example, the offsite sensor may include a communications interface such as Bluetooth, Wi-Fi, a cellular network interface, or the like and may transmit sensed biometric data to the system directly. Likewise, the offsite sensor 104 may transmit a sensor identifier as metadata to another part of the system 100 directly, without relaying the transmission through a user device.

In some implementations, such as where privacy is a concern, anonymized user identification data and/or sensed biometric data may be transmitted. For example, user identification data may include a anonymizing identifier, such as determined in operation 202 of the method 200. The anonymizing identifier may allow the system 100 to tie the sensed biometric data to a user, while maintaining the user's privacy. In some implementations, data may be encrypted before it is transmitted and decrypted when received, for further processing.

In some implementations, the user device may not transmit user identification data, such as when the user device itself identifies the user, and may simply transmit information that temperature data has been authenticated to a particular user. Data transmitted may include a unique event identifier. An event identifier may be used to correlate a particular authentication session with a given user 114, user device 102, and/or offsite sensor 104. The system 100 may grant or deny user access to an access controlled area as previously described.

As an example of the method 400, an offsite sensor 104 may receive user temperature or other biometric or biological data in operation 402. The offsite sensor 104 may store the sensed biometric data and the user may proceed to the perimeter of the access-controlled area. At the perimeter, the system 100 may receive user identification data in operation 404. The offsite sensor 104 may have a sensor identifier such as a serial number or dynamically variable identifier that can be used to associate the sensor 104 with the user. Using the sensor identifier, the system may authenticate the biometric sensor data to the user in operation 406. In operation 408, the offsite sensor 104 may transmit the sensor identifier and the biometric data to an entry point device in communication with the access server 110 (e.g., a kiosk) via an interface such as by Bluetooth, Wi-Fi, or the like. The system 100 may compare the received sensor identifier against the user entry in a database 112 and determine whether the sensor identifier is associated with the user. The system 100 may determine whether the biometric data meets the organizational standard. The system may approve user access to the access-controlled area.

As another example of the method 400, in operation 402 a user may take her temperature with an offsite sensor 104 such as a thermometer. The thermometer 104 may transmit temperature data to a user device 102 such as a smartphone, via Bluetooth. The smartphone 102 may receive user identification data, such as a facial image 116 and generate a facial mesh 124, in operation 404. In operation 406, the system 100 may authenticate the temperature data to the user based on the user identification data. The smartphone 102 may transmit the authenticated temperature data to the database 112 via a cellular network or Wi-Fi in operation 408.

Figure 5:
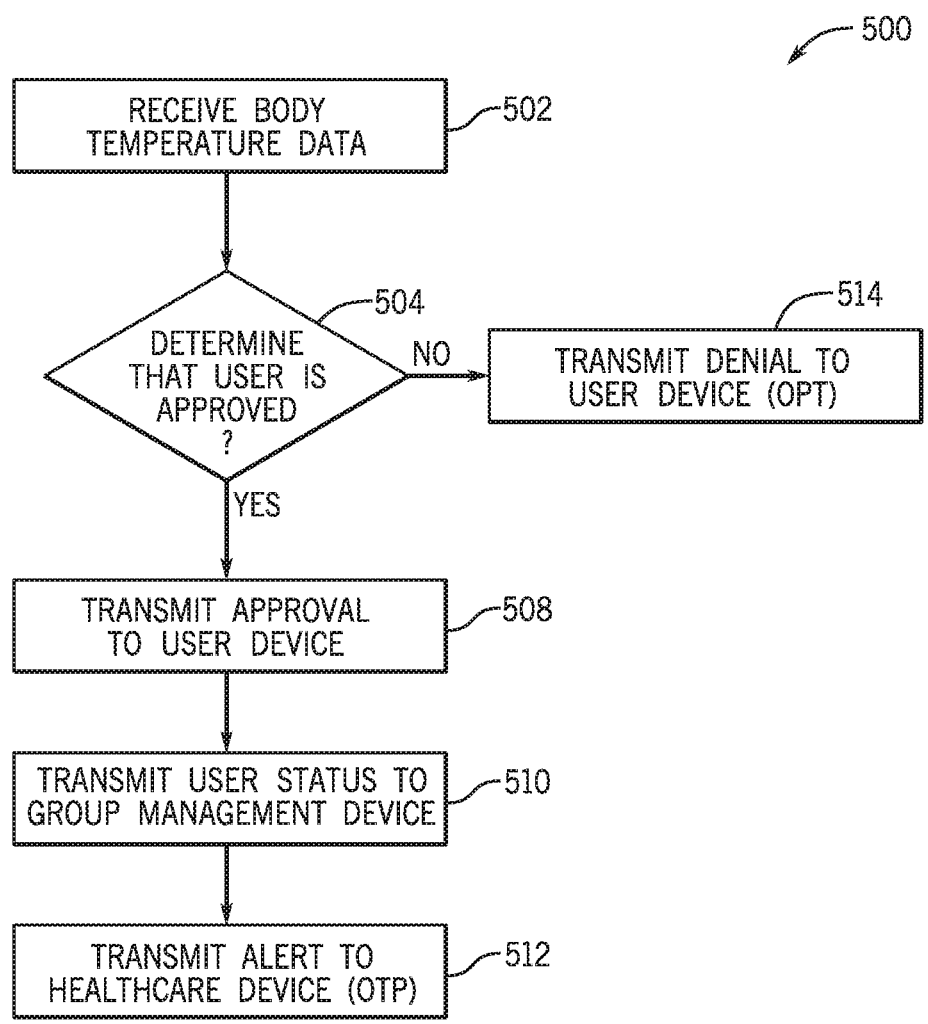
FIG. 5 is a flow chart illustrating a method of authenticating body temperature data to a user with the system of FIG. 1.

FIG. 5 is a flowchart of a method 500 to correspond a biometric sensor reading to a particular user, suitable for use with the system 100. The method 500 may be useful for access-controlled areas with multiple buildings and/or multiple entry points. With such access-controlled areas, it may not be practical to receive on-site user information, for instance at an entry point. Examples of such access-controlled areas may include campuses, such as college, government, or business campuses, where there may be multiple access points and/or multiple people accessing the area that onsite regulation of access is more difficult. The method may include operation 502 and the system 100 receives sensed biometric data (e.g., temperature data), such as by operations previously described, for example with respect to operations 302 and/or 402 of methods 300 and 400, respectively. The sensed biometric data may be authenticated to a user such as previously described with respect to operations 304, 404, and/or 406.

The method 500 may proceed to operation 504 and the system 100 determines that a user is approved to access the access-controlled area, such as described with respect to operation 306 of method 300. For example, if a user's biometric data does not meet an organizational standard, the user may not be approved to enter the access-controlled area (e.g., a user's body temperature is above a threshold, has red eyes, a reduced blood oxygen saturation, or the like). If the user is not approved to enter the access controlled area, a denial notification may optionally be transmitted to the user device 102 in operation 514.

If the user is approved to enter the access controlled area, the method may proceed to operation 508 and an approval notification is transmitted to the user device 102, as previously discussed, for example with respect to operation 308 of method 300.

The method may proceed to operation 510 and a user's approval status is transmitted to a group management device 134. A group management device 134 may be any type of computing device that can transmit and receive data from other computing devices. The group management device may be in electronic communication with other devices of the system 100 such as via the network 106. For example, the group management device 134 may be a smartphone, tablet computer, wearable device, laptop, and so on. The group management device 134 may be used by a person to manage a group of users so to as manage entry or ability to stay within an area for those users. The group management device 134 may display an indication of the status of users of the system 100. For example, the group management device 134 may display whether a user is approved to enter the access-controlled area, denied access, has not complied with the access screening requirements, or the like. The group management device 134 may display a dashboard 800 (see e.g., FIG. 8) that displays information regarding one or more users and their access conditions or status.

The method 500 may proceed to operation 512 and the system 100 optionally transmits an alert to a healthcare device indicating the user status. A healthcare device may be a device similar to the user device 102 and/or a group management device 134. A healthcare device may be used by a health professional to follow up with users whose biometric data does not meet the organizational standard.

In some implementations of the method 500, the system 100 may receive user identification data such as in operation 404 of the method 400. In some implementations, such as where privacy is a concern, the system 100 may use methods other than facial recognition to identify users. For example, when the method 500 is used with minors or students, facial recognition may not be allowed by organizational policy, individual user preference, or the like. In such implementations, other user identification data may be used, such as a user's name, or personal recognizance by an administrator or other user of the system 100 e.g., a teacher identifies a student, having met the student previously.

In one implementation of the method 500, the user may be one or more students and the access-controlled area may be a school campus, such as a college campus. The student takes her temperature or other sensed biometric data at home and transmits it to the system 100, for example in operation 502. If the system 100 determines the sensed biometric data falls within or below the organizational standards, such as a student's temperature is below a threshold (i.e., the student is not febrile) the system transmits an approval to the student to attend class, where the classroom is in an access-controlled area. Alternatively, if the system 100 determines the sensed biometric data falls outside or above the organizational standards, the system 100 transmits a denial to the student's user device, such as a smartphone, telling the student she may not attend class.

In operation 510, the system 100 transmits the student's approval status to a group management device 134, such as a tablet or laptop used by a professor. The professor's tablet may display the status of the students in the class. For example, the tablet may display an array of icons associated with the students, indicating the status of each student. For example, information related to students who have been approved to attend class may include an indication that they are approved to attend class, e.g., a green icon, "APPROVED" text, or the like. Information related to students who have been denied may include an indication that those students are not approved to attend class, e.g., a red icon, "NOT APPROVED" text, or the like. Information related to students for whom no biometric information has been received may be displayed indicating such, e.g., a red icon, "NOT APPROVED", "NO DATA", or the like. Other suitable status indicators may be used as well. The professor may then utilize the display to dismiss any students present that are not approved to attend class. The system 100 may optionally transmit student status to campus health authorities. The health authorities may follow up with students who are febrile for intervention, such as treatment, counseling, isolation, contact tracing or other support.

FIGS. 6A-6C illustrate an embodiment of a portion of the system 100 as may be used to execute the method 400. FIG. 6A shows an example of the system 100 executing operations 402 and 404, where the system 100 receives sensed biometric data (e.g., temperature data) and user identification data. FIG. 6A shows a user 114 holding a user device 102. The user 114 uses an offsite sensor 104, in this example, a non-contact thermometer 104 to measure the user's temperature. Other types of offsite sensors 104 may be used. For example, the offsite sensor 104 may be a pulse oximeter measuring blood oxygen saturation. In some implementations, more than one item of sensed biometric data may be used. For example, the offsite sensor 104 may measure both temperature and blood oxygen saturation. In another example, the facial image 116 may be analyzed to determine the color of the whites of the user's eyes to determine whether they are reddened. The thermometer 104 includes an optical display 118 to display temperature data via an indicia 120. In this example, the optical display 118 displays a user's temperature, for example 102° F. As shown in the example of FIG. 6A, both the user's face and the optical display 118 are in the field of view of a camera of the user device 102 at the same time. For instance, the user device 102 includes a display including a facial image 116 of the user 114 and an image of the optical display 118 showing the indicia 120. Thus, in this example, operations 402 and 404 are executed at the same time. The system 100 may use an optical character recognition algorithm to identify and interpret the indicia 120 and associate the indicia 120 with temperature data. For example, the system 100 may recognize one or more characters within the indicia 120 to determine the temperature data of "102° F.".

As shown for example in FIG. 6A, the user device 102, or a camera within the user device 102 may move to capture facial images 116 of the user's face from different points of view (either angles or distances) and develop depth information of the user's face and/or the offsite sensor 104. For example, the user may move the user device in a circular pattern or the like to allow the collection of additional depth information. Such depth information may be used by the system 100 to determine that the facial image 116 and/or the image of the offsite sensor are in fact three dimensional images of the user and offsite sensor 104 and thus thwart user's attempting to gain unauthorized access to an access-controlled area. For example, if a user were to hold up a paper image of an offsite sensor displaying a temperature reading, the system 100 may determine that the paper has little or no depth information and may not be authentic. For example, the depth information may indicate a size of the object purported to be an offsite sensor in three dimensions (e.g., length, width, depth) and compare the same to representative dimensions for an actual offsite sensor 104. If one or more dimensions is outside a range of dimensions for an actual offsite sensor, the system may determine that the purported sensor is not authentic.

FIG. 6B illustrates an example of a facial image 116 and offsite sensor 104 as viewed on a display of a user device 102. In this example, the offsite sensor, again a non-contact thermometer 104 in this example, displays both sensed biometric data (e.g., temperature data) and metadata via the optical display 118. In this example, the metadata is a dynamic identifier "ABC123". As previously described, the dynamic identifier may be generated by the thermometer 104 based on a seed value and a time stamp, and may be refreshed periodically. As discussed with operation 406, the user device may include a code generator using the same seed as the thermometer 104 to generate a dynamic identifier to compare against the dynamic identifier 122 to authenticate the body temperature data.

FIG. 6C illustrates an example of a facial image 116 and offsite sensor 104 as viewed on a display of a user device 102. A facial mesh 124 is determined based on the facial image 116 to identify the user, as described with respect to operation 404 of the method 400. For example, image and/or depth information may be utilized to extract facial features of a user and generate a mesh or a set of data points representative of the user. The facial mesh 124 may be compared against facial meshes in a user entry to authenticate the user. In many embodiments, the facial mesh 124 may not actually be displayed on the display of the user device 102.

In FIG. 6C, the offsite sensor 104 includes an optical display 118 displaying an indicia 120. In this example the machine readable code is a 2D barcode such as a QR code. The indicia 120 may encode various information determined, received, and/or generated by the offsite sensor 104. For example, the indicia 120 may include sensed biometric data such as temperature data and/or metadata such as a time stamp, identification data, thermometer identifier, location information, a dynamic identifier, or the like. In some examples, the offsite sensor 104 may include a biometric sensor that receives user identification data such as a fingerprint, retinal scan, or the like. Such user identification data may be encoded in the indicia 120. The elements such as an indicia 120 (alphanumeric or otherwise) or facial mesh 124 may be used with any of the examples of FIGS. 6A-6C. For example, a facial mesh 124 may be used with any of FIGS. 6A-6C. The system 100 may capture an image of the indicia and decode it to determine the sensed biometric data, the metadata, or other data. access-controlled area 128. The system 100 may receive the indicia 120, and/or the data associated with the indicia 120, by any suitable method including machine vision; optical character recognition; bar code scanning; wireless transfer such as Bluetooth, Wi-Fi, cellular network; wired transfer via a cord or cable; or the like, The user devices 102 and offsite sensors 104 may execute any of the methods disclosed herein in a substantially parallel fashion. For instance, at substantially the same time, multiple user devices 102 may receive temperature data and transmit that data to a user device, such as in operation 402 of the method 400. The user devices 102 may receive user identification data, as previously described such as in operation 404, may authenticate body temperature data as in method 406, and may transmit authenticated body temperature data to the access server 110. In some implementations the user device 102 may receive the offsite sensor data and user identification data in a serial fashion, in any order.

Such a system may have certain technical advantages over access control systems that work in a largely serial (e.g., one entry kiosk), or limited parallel fashion (several entry kiosks). The advantage may be significant in instances where many people are attempting to gain access to an access-controlled area 128 at about the same time, such as at the start of a workday, beginning of school, a concert, or the like. In some implementations, there may be a near 1:1 correspondence between the number of users 114, user devices 102, and offsite sensors 104, so as to virtually eliminate entry delays. Thus, the system 100 may reduce or eliminate queueing and delays to access an access-controlled area 128.

Figure 7:
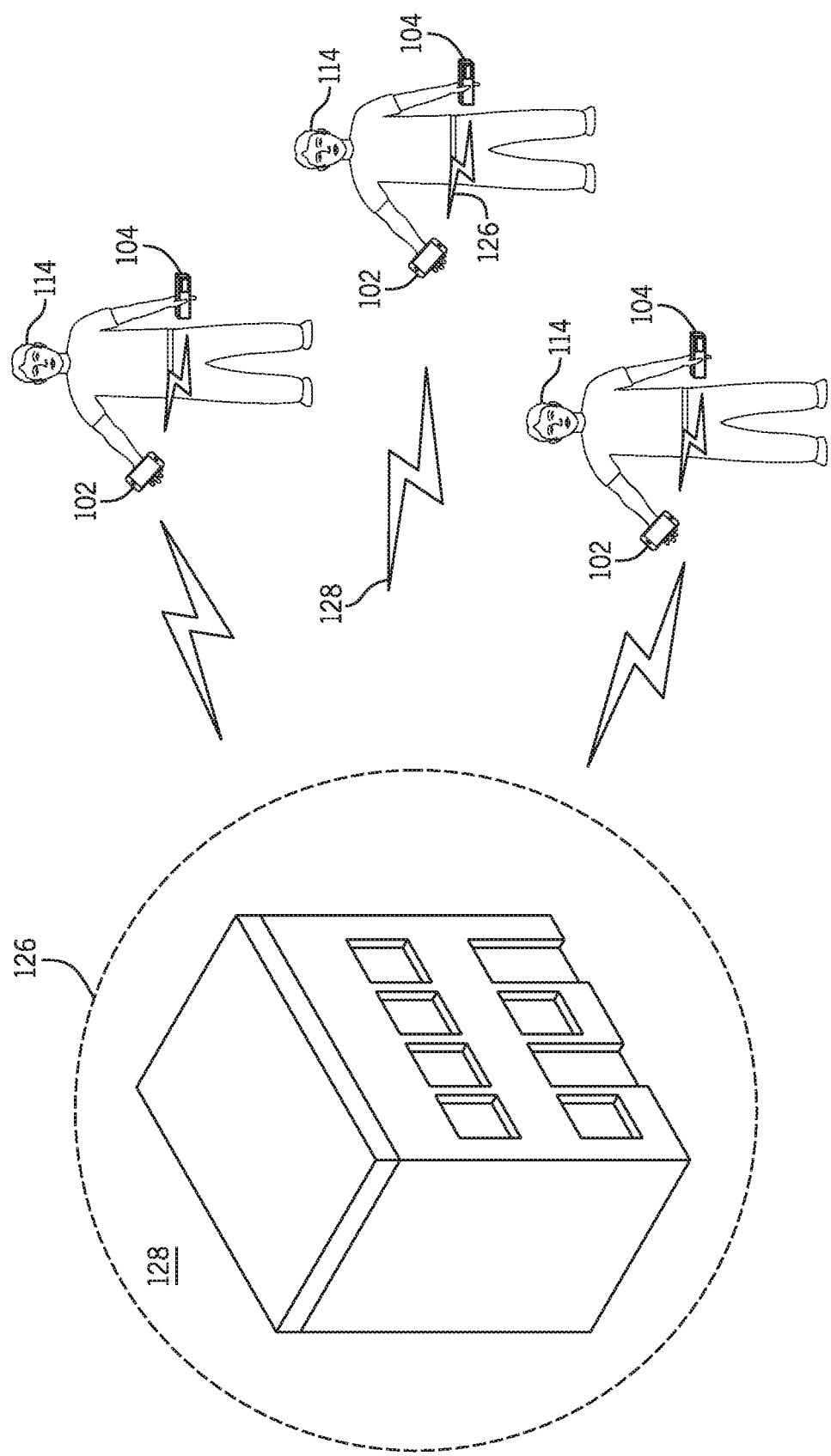
FIG. 7 is a simplified diagram of an example of the system of FIG. 1.

As illustrated in FIG. 7, the offsite sensors 104 may transmit temperature data, user identification data, metadata, or other data to a user device 102 via a first method 130, such as Bluetooth, optical character recognition, near field communication, or the like. The user device 102 may transmit data to other parts of the system 100 such as the access control server 110 and/or the database 112 via a second method 132 such as a cellular, Wi-Max, or Wi-Fi network. In many implementations, the first method 130 is a short range communication method and the second method 132 is a longer range communication method compared to the first method 130.

Figure 8:
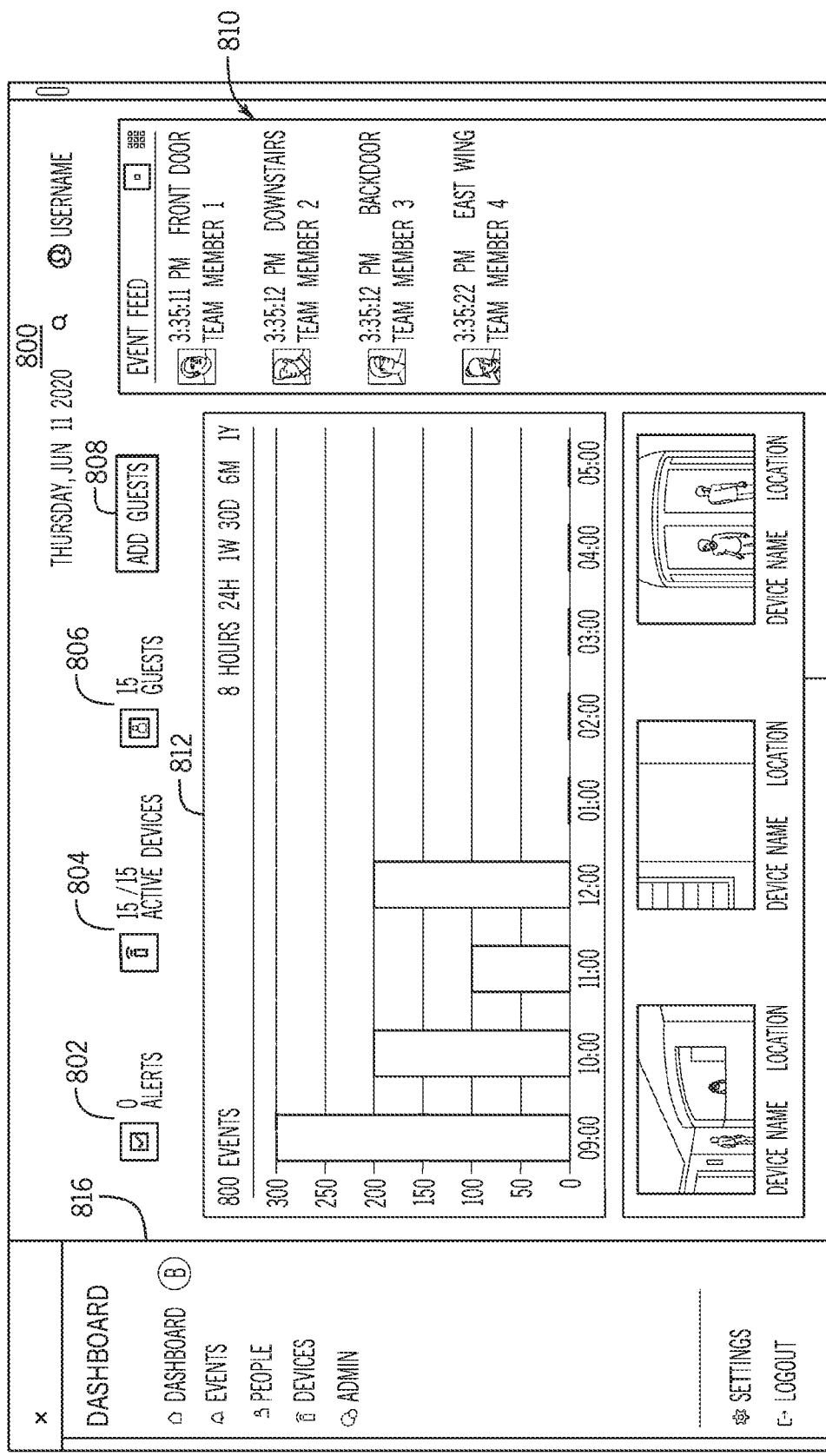
FIG. 8. is a schematic of a dashboard for use with the system of FIG. 1.

FIG. 8 illustrates a dashboard 800 for use with the system 100. The dashboard 800 may display and/or accept input related to any information or data associated with any device or method disclosed herein, such as the methods 200, 300, 400 and/or 500. For example, the dashboard 800 may receive and display information such as the number of users of the system 100, the time a user has interacted with the system 100, a log of such times, user status, the ability of an administrator to search for a user, a point of entry/exit to an access controlled area, information related to user devices 102, offsite sensors 104, user entries in the database 112, and so on. The dashboard may accept input from a user, such as an administrator of the system 100. The dashboard 800 may be displayed on, or receive input from, any suitable computing device, such as a smartphone, tablet computer, laptop, a display associated with the access server 110 and so on. Dashboards may be tailored to specific implementations of any of methods 200, 300, 400, and/or 500, or portions thereof.

In some examples, the dashboard 800 displays information related to a user entry in the database 112, and may accept user input to enable creation of the user entry, such as in operation 202 of the method 200. The dashboard 800 may display an image of a user, such as an image captured as with the creation of the user entry, such as in operation 204 of the method 200. The dashboard 800 may enable a user to create, modify, or review an organizational standard, such as in operation 206 of the method 200.

In some examples, the dashboard 800 may display offsite sensor data received for example in operation 302. The dashboard 800 may display user identification data received for example in operation 304. The dashboard 800 may display a determination by the system that a user is approved to enter the access-controlled area such as in operation 306. The dashboard 800 may display a status indicating that an approval has been sent to a user such as in operation 308. The dashboard may display on-site user information, such as received in operation 310. The dashboard 800 may display user status such as determined in operation 312. The dashboard may display user access authorization such as determined in operation 314.

In some examples, the dashboard 800 may display offsite sensor data received for example in operation 402, such as sensed biometric data. The dashboard 800 may display received user identification data such as a facial image 116 and/or a facial mesh 124, such as received in operation 404. The dashboard 800 may display authenticated biometric data such as determined in operations 406 and transmitted in operation 408.

In some examples, the dashboard 800 may display offsite sensor data received for example in operation 502, such as sensed biometric data. The dashboard 800 may display a user approval status such as determined in operation 504. The dashboard 800 may display a transmittal status of an approval or denial transmission to a user device 102 such as in operation 508 and/or 514. The dashboard 800 may display user status transmitted by a user device in operation 510. The dashboard 800 may display an indication that biometric data has not been received for a user, such as if a user fails to take her temperature. The dashboard 800 may display an indication that an alert has been transmitted to a healthcare device, such as in operation 512.

In one example of a dashboard 800 associated with the method 500, the dashboard 800 may display a roster of students registered for a class. The dashboard 800 may display facial images 116 of students and other information associated with the students, such as names, student identification numbers, or the like. The dashboard 800 may indicate whether a student is approved to attend the class. For example, if a student has captured sensed biometric data (e.g., temperature), the system 100 determines that the biometric data falls within an acceptable range set by an organizational standard, and the student is approved to attend class, the dashboard 800 may display an indication that the student is approved to attend class. For example, a green icon or word of approval may appear near the student's name and/or facial image. If a student submits biometric data that is outside an acceptable range set by an organizational standard, the dashboard may display an indication that the student is not approved to attend class. For example, a red icon or word of denial may appear near the student's name and/or facial image. Likewise, if biometric data has not been received from a student, the dashboard may display an indication that data has not been received and/or that the student is not approved to attend class. For example, a grey icon or words indicating a lack of biometric data may appear near the student's name and/or facial image.

An example of a dashboard 800 is shown in FIG. 8. The dashboard 800 includes an alert area 802, such as may be suitable for displaying access denials, detection of biometric data outside of organizational standards, healthcare alerts, and the like. The dashboard 800 may include user device data 804 associated with user devices 102, such as a number of active devices. The dashboard 800 may include a menu 816 to allow access to various aspects of the dashboard 800, configurations of the system 100, or the like.

The dashboard 800 may include guest data 806 indicative of information associated with guests within the access-controlled area 128. The dashboard 800 may be coupled to an actuator 808 to add a guest to the access-controlled area 128. For example, by providing input to the dashboard 800, a user can actuate a gate or other element to allow a user access to an access controlled area.

The dashboard 800 may include an image area 814 that displays information received from one site sensors, such as real time views of the access-controlled area 128, the perimeter 126, or the like such as may be captured by a security camera. The image area 814 may be sufficient to capture locations of user devices 102 associated with the system 100. For example, if a user device 102 is presented at the perimeter 126 to gain access to the access-controlled area, the dashboard 800 may automatically display an image of the access point, the device and/or the user. In these instances, the system may combine image data with other data from the user device (e.g., location data or sensed data) that helps to locations of the user devices relative to an access point.

The dashboard 800 may include a main data display 812. The main data display 812 may display any data associated with the system 100 or any method disclosed herein. In the example of FIG. 8, the system 100 may generate a historical chart of user interactions with the system 100, which can be displayed on the main data display 812 The historical chart may have a configurable time span displayed along the horizontal axis, e.g., 8 hours, 24 hours, 1 week, 30 days, 6 months, 1 year, or the like, that allows a user to selectively display historical information from the system 100. The main data display may be configurable or adaptable to display detailed data. A user may select an image from the image area 814 and a larger version of the image may populate the main data display 812.

In some embodiments, the system 100 may track events related to the system 100 and/or locations of those events. For example, the dashboard 800 may include an event log 810 that pulls data regarding people, events, locations, and the like from the system 100. The event log 810 may include a listing of user interactions with the system 100. The system 100 may track users who have entered and/or left the access-controlled area and optionally store this information in an event log database, which can be used to generate the event log 810 display. For example, the event log 810 may include a time of the interaction, a user identifier, a user point of entry to the access-controlled area 128, user status, facial image 116, facial mesh 124, sensed biometric data, combination of elements, or the like.

Likewise, the system 100 may track events including the locations, times, and users associated with receipt of biometric data. For example, the system 100 may track events of readings of biometric data that does not meet organizational standards. Such tracking could be used to identify outbreaks of disease or health issues. For example, the system 100 may overlay on a map, indicators showing the time and location of a reading of a febrile condition. Such indicators could be aggregated to certain geographic areas such as a building, street, block, campus, neighborhood, zip code, area code, city, county, state, region, country, continent, or the like, as well as a time and date information as to when the conditions occurred. The system may display an aggregated map or list of events and enable a user to drill down to greater levels of detail and specificity. In some embodiments the system may display a map of events that can be varied over time, such as to spot trends. For example, the system 100 may display a map of events corresponding to the detection of febrile conditions, that may be indicative of an outbreak or the spread of a disease. In this manner, the system 100 may be used to track outbreak conditions, such as of disease, based on location, users (e.g., determine spreader information), events, and so on.

In some embodiments, two or more systems 100 may be in communication with one another, even in instances where the systems are operated by different organizations. The systems 100 may share any data associated with the systems 100. The systems 100 may share data related to the detection of biometric data that does not meet organizational standards. For example, the systems 100 may share data related to the detection of febrile conditions. In one example, a university may have multiple campuses with a system 100 at each campus. The systems 100 may communicate with one another to share disease outbreak data. Such sharing may enable contact tracing, additional cleaning, the enforcement of social distancing, mask wearing, or other preventative measures to combat the outbreak. Continuing the example of the multiple campuses, the university systems 100 may share data with a system 100 operated by a government entity such as a state or county health department. The multiple systems 100 may form an interconnected system of access control systems to aid in the widespread tracking, prevention and mitigation of disease outbreaks.

In various embodiments, the system 100 and methods 200, 300, 400, 500 can be used to verify or check user health information (e.g., temperature, respiratory systems, or the like) offsite or remote from a particular location. This allows organizations to safely screen employees and other people accessing the location, without a risk of contamination or spreading viruses, bacteria, etc. within the location. The system 100 and the methods 200, 300, 400, 500 can be used to track a user's location to determine whether the user has entered a hot zone. For example, should a user enter a hot zone, the system 100 may deny access to an access-controlled area for an amount of time, (e.g., an incubation period for a disease of interest), or may require the user temperature to be re-authenticated. Also, the system 100 may allow for dual authentication of a user, first at a remote or offsite location and second at the access-controlled area, reducing risks of security breaches and the like. Additionally, in many instances the offsite sensors may be much less expensive than onsite biometric sensors, such as larger area thermal scanners, which in addition to being extremely expensive, also only work within ranges of tens of feet, which means that potentially sick users will have already entered a location before they are screened. The operations of the methods herein may be executed in an order other than as presented, and some operations may be executed at substantially the same time.

In some embodiments, the access server 110 may share information with other databases, such as third-party databases. For example, in some embodiments, a user may permit his or her information to be shared with other organizations to allow access to other access-controlled areas. As a specific example, a workplace may share data on employee information to a retail or restaurant space adjacent to the workplace, so that employees that satisfy the biological thresholds or standards for the workplace may be admitted to the retail or restaurant space. In this example, the user information may not be shared with the third party database, but merely the biological "approval" or sensed parameter of interest to the third party.

In some embodiments, the system may transmit information regarding groups of users and their status (e.g., approved, not approved, or information needed) to a group management device. The group management device may be used to allow a user, such as a teacher, professor, security guard, receptionist, or the like, to allow physical access to an area and/or instruct a person to provide more data to the system. As an example, a dashboard may be presented to a user that allows the user to quickly review user status based on all users assigned to an area (e.g., classroom) for a particular time, and a professor can instruct users to leave an area based on failing to provide information to the system and/or failing organizational standards. In this manner, the system may be able to control access to areas even where physical barriers are not present, such as large university campuses and the like.

Additionally, in some embodiments, the system may store data corresponding to event information, including user biometric readings, locations, user movement and access, and so on. This information may be shared (such as after anonymization) across multiple organizations to help better track disease and other conditions. For example "heat maps" can be generated that show high febrile conditions based on location. Additionally, because the system 100 may record user access information, such as user time, date, and entry to particular locations, the system may be leveraged to assist in contact tracing by being able to quickly generate lists of other users that have accessed similar areas at similar times as an infected user.

It should be noted that one or more components of the system 100 may include computing devices, which may have one or more components. For example, the computing devices may include one or more input/output interfaces that receive or transmit data (e.g., view the network 106) to different devices. The computing devices may include memory components that store data, e.g., read only memory, random access memory, solid state drive, and/or secure digital cards. The memory may store executable instructions that may be executed by the one or more processing elements.

The processing elements may be any type of component that can execute instructions or receive data. Examples of the processing elements include central processing units, graphics processing units, mobile processors, digital signal processors, microprocessors, micro controllers, computer chips, and the like.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
receiving offsite sensor data-indicative of health of a user transmitted from a mobile user device corresponding to the user, wherein the offsite sensor data is captured at, and transmitted from, an offsite area located outside of a facility including an access-controlled area;
receiving offsite user identification data corresponding to the offsite sensor data and the user, wherein the offsite user identification data is captured at, and transmitted from, the offsite area;
determining that the offsite sensor data satisfies an organizational standard related to the health of the user;
determining that the offsite user identification data corresponds to an approved user for the access-controlled area; and
transmitting a notification to the mobile user device, the notification indicating authorization of the user to access the access-controlled area, wherein the notification is transmitted to the mobile user device as the mobile user device is located at the offsite area.

2. The method of claim 1, wherein the notification comprises authentication data to authenticate the user at an onsite access point for the access-controlled area.

3. The method of claim 2, further comprising verifying the authorization of the user to access the access-controlled area based on the authentication data received at an onsite sensor.

4. The method of claim 1, further comprising:
receiving onsite user information transmitted from a location corresponding to the facility; and
using the offsite sensor data and the onsite user information to verify the authorization of the user to access the access-controlled area.

5. The method of claim 1, wherein the offsite sensor data comprises temperature information.

6. The method of claim 1, further comprising receiving a first metadata associated with the offsite sensor data.

7. The method of claim 6, further comprising receiving a second metadata associated with the offsite user identification data.

8. The method of claim 7, wherein the first metadata and the second metadata are one of a time stamp, a user location, or a dynamic identifier, respectively.

9. The method of claim 8 further comprising comparing the first metadata to the second metadata to authenticate that the offsite sensor data is associated with the offsite user identification data.

10. The method of claim 1, further comprising transmitting a notification to a group management device.

11. The method of claim 1, wherein the offsite sensor data comprises a user location, determined by the mobile user device and the method further comprises verifying that the user location is the offsite area.

12. The method of claim 1, wherein the offsite sensor data comprises a dynamic identifier.

13. The method of claim 1, wherein the offsite user identification data comprises a user location corresponding to the offsite location.

14. The method of claim 1, wherein the offsite user identification data comprises a dynamic identifier.

15. The method of claim 1, wherein the offsite area comprises a non-access-controlled area.

16. The method of claim 1, wherein the user device comprises at least one user device linked to the user.

17. The method of claim 16, wherein the user device comprises a first user device and a second user device.

18. A method comprising:
receiving offsite sensor data indicative of health of a user transmitted from a user device corresponding to the user, wherein the offsite sensor data is captured at an offsite area located away from a perimeter of an access-controlled area;
receiving offsite user identification data corresponding to the offsite sensor data and the user, wherein the offsite user identification data is captured at the offsite area;
determining that the offsite sensor data satisfies an organizational standard related to the health of the user;
determining that the offsite user identification data corresponds to an approved user for the access-controlled area;
transmitting a notification to the user device, the notification indicating authorization of the user to access the access-controlled area; and receiving the offsite sensor data and the offsite user identification data at substantially a same time, wherein:
the offsite user identification data includes a facial image of the user,
the offsite sensor data is encoded in an indicia, and
the facial image is captured by the user device in an image and the indicia is captured by the user device in the image together with the facial image.

19. The method of claim 18, wherein the indicia comprises one or more alphanumeric characters and the method further comprises recognizing the one or more alphanumeric characters to determine the offsite sensor data.

20. The method of claim 19, wherein the one or more alphanumeric characters include a dynamic identifier that authenticates the offsite sensor data and the method further comprises recognizing the one or more alphanumeric characters to determine the dynamic identifier.

21. The method of claim 20, wherein the offsite sensor data comprises temperature data.

22. The method of claim 18, wherein the indicia is a machine readable code and the method further comprises decoding the machine readable code to determine the offsite sensor data.

23. The method of claim 22, wherein the machine readable code encodes a dynamic identifier and the method further comprises decoding the machine readable code to determine the dynamic identifier.

24. The method of claim 22, wherein the offsite sensor data comprises temperature data.

25. A system to control access to an access-controlled area comprising:
an offsite sensor configured to receive offsite sensor data indicative of health of a user, the offsite sensor located at an offsite area located outside of a facility including the access-controlled area;
a mobile user device corresponding to the user and configured to receive the offsite user identification data associated with the user and to determine a location of the user;
a processing element in communication with the mobile user device configured to:
determine that the offsite sensor data satisfies an organizational standard related to the health of the user;
verify that the location of the user corresponds to the offsite area;
determine that the offsite user identification data corresponds to an approved user for the access-controlled area; and
transmit a notification to the mobile user device, the notification indicating authorization of the user to access the access-controlled area.

26. The system of claim 25, wherein the processing element is further configured to:
receive onsite user information captured at the access-controlled area; and
using the offsite sensor data and the onsite user information to verify the authorization of the user to access the access-controlled area.

27. The system of claim 25, wherein the system is configured to receive a first metadata associated with the offsite sensor data.

28. The system of claim 27, wherein the system is configured to receive a second metadata associated with the offsite user identification data.

29. The system of claim 28, wherein the first metadata and the second metadata are one of a time stamp, a user location, or a dynamic identifier that authenticates the offsite sensor data, respectively.

30. The system of claim 25, wherein the offsite sensor data and the offsite user identification data are received at substantially a same time.

31. The system of claim 30, wherein:
the offsite user identification data includes a facial image of the user; and
the offsite sensor data is encoded in an indicia.

32. The system of claim 31, wherein the facial image is captured by the user device in an image and the indicia is captured by the user device in the image together with the facial image.

33. The system of claim 32, wherein the offsite sensor data comprises temperature information.

34. The system of claim 25, wherein the offsite sensor includes a sensor identifier associated with the user and is configured to transmit the sensor identifier and the offsite sensor data to the processing element to determine if the user is approved for access to the access-controlled area.

35. A method comprising:
receiving sensed biometric data-indicative of health of a user transmitted from a mobile user device corresponding to the user;
receiving user identification data corresponding to the user, wherein the sensed biometric data and the user identification data are captured at and transmitted from an offsite area located outside of a facility including an access-controlled area;
authenticating the sensed biometric data to the user based on the offsite user identification data;
determining that the sensed biometric data satisfies an organizational standard related to the health of the user regarding access to an access controlled area;
determining that the user is approved to access an access-controlled area based on the satisfaction of the organizational standard; and
transmitting an approval notification corresponding to the user approval to the mobile user device, wherein the notification is transmitted to the mobile user device as the mobile user device is located at the offsite area.

36. The method of claim 35 further comprising transmitting user status to a healthcare device.

37. The method of claim 35, wherein the user status further comprises one of an approval or a disapproval.

38. The method of claim 35, wherein the user status comprises an indication that the sensed biometric data corresponding to the user has not been received.

* * * * *